(12) United States Patent
Takagi et al.

(10) Patent No.: US 7,688,389 B2
(45) Date of Patent: Mar. 30, 2010

(54) RECEIVING APPARATUS AND IMAGE RECEIVING APPARATUS DIRECTED TO A USER VIEWING ANALOG BROADCASTS PREFERENTIALLY

(75) Inventors: Toshihiro Takagi, Daito (JP); Toshiya Iwahashi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1073 days.

(21) Appl. No.: 11/359,030

(22) Filed: Feb. 22, 2006

(65) Prior Publication Data

US 2006/0203129 A1    Sep. 14, 2006

(30) Foreign Application Priority Data

Mar. 8, 2005    (JP) .............................. 2005-063578

(51) Int. Cl.
*H04N 5/50* (2006.01)
*H04N 3/27* (2006.01)

(52) U.S. Cl. ...................................... 348/731; 348/554

(58) Field of Classification Search ................. 348/731, 348/732, 554, 555, 558, 725, 570; 725/38, 725/56, 59
See application file for complete search history.

(56) References Cited

U.S. PATENT DOCUMENTS

| | | | | | |
|---|---|---|---|---|---|
| 6,111,611 | A | * | 8/2000 | Ozkan et al. | 348/465 |
| 6,137,546 | A | * | 10/2000 | Shintani et al. | 348/731 |
| 6,359,580 | B1 | * | 3/2002 | Morrison | 348/731 |
| 6,707,508 | B1 | * | 3/2004 | Mears et al. | 348/731 |
| 7,061,542 | B1 | * | 6/2006 | Ikeguchi | 348/558 |
| 7,546,623 | B2 | * | 6/2009 | Ramraz et al. | 725/48 |
| 2002/0051092 | A1 | * | 5/2002 | Kim | 348/731 |
| 2004/0036811 | A1 | * | 2/2004 | Ikeguchi | 348/732 |
| 2004/0068751 | A1 | * | 4/2004 | Basawapatna et al. | 725/117 |
| 2005/0036073 | A1 | * | 2/2005 | Bae et al. | 348/732 |

(Continued)

FOREIGN PATENT DOCUMENTS

JP        11-164214        6/1999

(Continued)

OTHER PUBLICATIONS

Patent Abstracts of Japan, Application No. 11-164214, dated Jun. 18, 1999 (1 page).

(Continued)

*Primary Examiner*—Victor Kostak
(74) *Attorney, Agent, or Firm*—Osha • Liang LLP

(57) ABSTRACT

A receiving apparatus improving manipulability for a user who watches analog broadcasts exclusively is provided. The receiving apparatus includes a NIM, an input portion that accepts channel numbers of both of the type used for analog broadcasting and the type used for digital broadcasting, a CPU that determines whether the NIM has extracted a broadcast signal of the digital broadcasting, sets the frequency of the radio waves from which the NIM will extract the broadcast signal so as to extract the broadcast signal of the broadcasting corresponding to the channel number, and controls the input portion to accept the channel number of the type different from that for the digital broadcasting until the CPU itself determines that the NIM has extracted the broadcast signal of the digital broadcasting, and a MPEG decoder that outputs the broadcast signal extracted by the NIM.

4 Claims, 10 Drawing Sheets

U.S. PATENT DOCUMENTS

2005/0073614 A1* 4/2005 Yukiyoshi .................. 348/732
2006/0033846 A1* 2/2006 Ozaki et al. ................ 348/731

FOREIGN PATENT DOCUMENTS

| JP | 2002-232796 | 8/2002 |
| JP | 2003-153102 | 5/2003 |

OTHER PUBLICATIONS

Patent Abstracts of Japan, Application No. 2002-232796, dated Aug. 16, 2002 (1 page).

Patent Abstracts of Japan, Application No. 2003-153102, dated May 23, 2003 (1 page).

* cited by examiner

FIG.2

| CHANNEL NUMBER | TUNING INFORMATION | TUNABILITY |
|---|---|---|
| CH3 | × × | TUNABLE |
| CH5 | × × × | UNTUNABLE |
| CH7 | × × △ | TUNABLE |
| CH9 | × × ○ | UNTUNABLE |
| ⋮ | ⋮ | ⋮ |
| CH40 | × × ○○ | UNDECIDED |
| CH41 | × × ○ × | UNDECIDED |
| ⋮ | ⋮ | |
| CH50 | × × ○△ | UNDECIDED |

RECEIVING APPARATUS AND IMAGE RECEIVING APPARATUS DIRECTED TO A USER VIEWING ANALOG BROADCASTS PREFERENTIALLY

BACKGROUND OF THE INVENTION

1. Field of the Invention

The present invention relates to a receiving apparatus and an image receiving apparatus, and more particularly to a receiving apparatus and an image receiving apparatus capable of receiving a plurality of types of signals.

2. Description of the Background Art

Japanese Patent Laying-Open No. 2002-232796 discloses a channel selecting apparatus wherein, upon instruction of change of main/sub-channels by ten keys, when there is an input of the "-" key, the main channel now being received is confirmed, and an OSD (On Screen Display) indicating the state awaiting an input of the sub-channel is made on a display device.

According to this invention, the hierarchical structure of the channels is understood intuitionally, and the step of inputting the main channel is simplified to improve manipulability.

Japanese Patent Laying-Open No. 11-164214 discloses a television broadcasting receiver which includes a digital television broadcasting tuner, a ground wave television broadcasting tuner, and a switching device for selecting one of the outputs of the tuners. This television broadcasting receiver is provided with ten keys for use in inputting a channel number, and a system controller that controls the switching device based on the channel number input via the ten keys.

According to this invention, it is possible to eliminate the need of manipulating a mode switching key when switching between a program of the digital television broadcasting and a program of the ground wave television broadcasting.

Japanese Patent Laying-Open No. 2003-153102 discloses a television receiver that includes a view history storage device for storing the number of a channel tuned by the user and the number of times of the tuning, a favorite number registration portion for registering the user's favorite program, a favorite category registration portion for registering the user's favorite category, a contract information discrimination portion for discriminating the contract state of a pay program, a view history analyzing portion for retrieving the user's favorite program from among the viewable programs that matches the numbers up to the digits input into the channel number input field, a control portion for complementarily inputting the digits not yet input in the channel number input field, and a display device for displaying the list of the channel programs extracted by the view history analyzing portion.

According to this invention, it is possible to improve operational functionality at the time of tuning by inputting the channel number, by complementarily inputting the channel number matching the taste of the user.

With the inventions disclosed in the above-described Japanese Patent Laying-Open Nos. 2002-232796 and 11-164214, however, the manipulation may rather be more burdensome for a user who watches analog broadcasts exclusively. Since they each permit manipulation for the digital broadcasting when the manipulation for the digital broadcasting is unnecessary, if the user makes an erroneous input (e.g., if the channel number for the digital broadcasting such as "2-1" is input), both of the manipulation for the digital broadcasting and the manipulation for the analog broadcasting will have to be made to correct the error.

Further, the invention disclosed in Japanese Patent Laying-Open No. 2003-153102 does not give any special consideration to the manipulability of the user who watches the analog broadcasts exclusively.

SUMMARY OF THE INVENTION

The present invention has been made to solve the above-described problems. An object of the present invention is to provide a receiving apparatus and an image receiving apparatus that can improve manipulability for a user who watches analog broadcasts exclusively.

To achieve the above object, a receiving apparatus according to an aspect of the present invention includes: a tuner; a determining unit for determining whether the tuner has extracted a broadcast signal of digital broadcasting; an accepting portion for accepting a channel number of a type used for analog broadcasting and a channel number of a type used for the digital broadcasting; a setting unit for setting a frequency of radio waves from which the tuner will extract the broadcast signal so as to extract the broadcast signal of broadcasting corresponding to a channel number; a control unit for controlling the accepting portion to accept the channel number of the type different from the type used for the digital broadcasting from the time when a plurality of frequency values set by the setting unit have been established to the time when the determining unit determines that the tuner has extracted the broadcast signal of the digital broadcasting; and an output device for outputting the broadcast signal extracted by the tuner.

That is, the accepting portion accepts a channel number of the type used for analog broadcasting and a channel number of the type used for digital broadcasting. The determining unit determines whether the tuner has extracted a broadcast signal of the digital broadcasting. The control unit controls the accepting portion to accept the channel number of the type different from that for the digital broadcasting from the time when a plurality of frequency values set by the setting unit have been established to the time when the determining unit determines that the tuner has extracted the broadcast signal of the digital broadcasting. The setting unit sets the frequency of the radio waves from which the tuner will extract the broadcast signal such that the broadcast signal of the broadcasting corresponding to the channel number is extracted. With this configuration, the user watching exclusively the analog broadcasts does not need to perform any manipulation for inputting a channel of the type used for the digital broadcasting. Even in the case where a broadcast signal of the digital broadcasting is once received, the accepting portion can accept a channel number of the type different from the type used for the digital broadcasting every time a frequency value set by the setting unit is established. It is often the case that, when there is a need to make it possible to accept a channel number different from that for the digital broadcasting again after it is once set to accept the channel number for the digital broadcasting, a plurality of frequencies among the frequencies being set by the setting unit have already been established. As a result, it is possible to provide a receiving apparatus that improves manipulability and convenience particularly for a user who watches analog broadcasts exclusively.

According to another aspect of the present invention, a receiving apparatus includes: a tuner; a determining unit for determining whether the tuner has extracted a broadcast signal of digital broadcasting; an accepting portion for accepting a channel number of a type used for analog broadcasting and a channel number of a type used for the digital broadcasting;

a setting unit for setting a frequency of radio waves from which the tuner will extract the broadcast signal so as to extract the broadcast signal of broadcasting corresponding to a channel number; a control unit for controlling the accepting portion to accept the channel number of the type different from the type used for the digital broadcasting until the determining unit determines that the tuner has extracted the broadcast signal of the digital broadcasting; and an output device for outputting the broadcast signal extracted by the tuner.

That is, the accepting portion accepts a channel number of the type used for analog broadcasting and a channel number of the type used for digital broadcasting. The determining unit determines whether the tuner has extracted a broadcast signal of the digital broadcasting. The control unit controls the accepting portion to accept the channel number of the type different from that for the digital broadcasting until the time when the determining unit determines that the tuner has extracted a broadcast signal of the digital broadcasting. The setting unit sets the frequency of the radio waves from which the tuner will extract the broadcast signal such that the broadcast signal of the broadcasting corresponding to the channel number is extracted. With this configuration, the user watching exclusively the analog broadcasts does not need to perform any manipulation for inputting a channel of the type used for the digital broadcasting. As a result, it is possible to provide a receiving apparatus that improves manipulability particularly for the user who watches the analog broadcasts exclusively.

Preferably, the above control unit includes a unit for controlling the accepting portion to accept the channel number of the type different from the type used for the digital broadcasting from the time when a frequency value set by the setting unit has been established to the time when the determining unit determines that the tuner has extracted the broadcast signal of the digital broadcasting.

That is, the control unit controls the accepting portion to accept a channel number of the type different from that for the digital broadcasting only during a period from the time when the frequency value set by the setting unit has been established to the time when the determining unit determines that the tuner has extracted the broadcast signal of the digital broadcasting. With this configuration, even in the case where a broadcast signal of the digital broadcasting is once received, the accepting portion can accept a channel number of the type different from that for the digital broadcasting every time the frequency value set by the setting unit is established. As a result, it is possible to provide a receiving apparatus that improves manipulability and convenience for the user who watches the analog broadcasts exclusively.

Still preferably, the time when a frequency value set by the setting unit has been established includes the time when a plurality of such frequency values have been established.

That is, the control unit controls the accepting portion to accept a channel number of the type different from that for the digital broadcasting only during a period from the time when a plurality of frequency values set by the setting unit have been established to the time when the determining unit determines that the tuner has extracted the broadcast signal of the digital broadcasting. It is often the case that, when there is a need to make it possible again to accept a channel number different from that for the digital broadcasting after it is once set to accept the channel number for the digital broadcasting, a plurality of frequencies among the frequencies being set by the setting unit have already been established. As such, convenience for the user can further be improved. As a result, it is possible to provide a receiving apparatus that improves manipulability and convenience for a user who watches the analog broadcasts exclusively.

According to yet another aspect of the present invention, an image receiving apparatus includes: a tuner; a determining unit for determining whether the tuner has extracted a broadcast signal of digital broadcasting; an accepting portion for accepting a channel number of a type used for analog broadcasting and a channel number of a type used for the digital broadcasting; a setting unit for setting a frequency of radio waves from which the tuner will extract the broadcast signal so as to extract the broadcast signal of broadcasting corresponding to a channel number; a control unit for controlling the accepting portion to accept the channel number of the type different from the type used for the digital broadcasting until the determining unit determines that the tuner has extracted the broadcast signal of the digital broadcasting; a converting device for converting the broadcast signal extracted by the tuner to a video signal; and a display device for displaying a video image using the video signal converted by the converting device.

That is, the accepting portion accepts a channel number of the type used for analog broadcasting and a channel number of the type used for digital broadcasting. The determining unit determines whether the tuner has extracted a broadcast signal of the digital broadcasting. The control unit controls the accepting portion to accept the channel number of the type different from that for the digital broadcasting until the time when the determining unit determines that the tuner has extracted a broadcast signal of the digital broadcasting. The setting unit sets the frequency of the radio waves from which the tuner will extract the broadcast signal such that the broadcast signal of the broadcasting corresponding to the channel number is extracted. With this configuration, the user watching exclusively the analog broadcasts does not need to perform any manipulation for inputting a channel of the type used for the digital broadcasting. As a result, it is possible to provide an image receiving apparatus that improves manipulability for the user who watches the analog broadcasts exclusively.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a conceptual diagram of a table according to the embodiment of the present invention.

DESCRIPTION OF THE PREFERRED EMBODIMENTS

Figure 1:
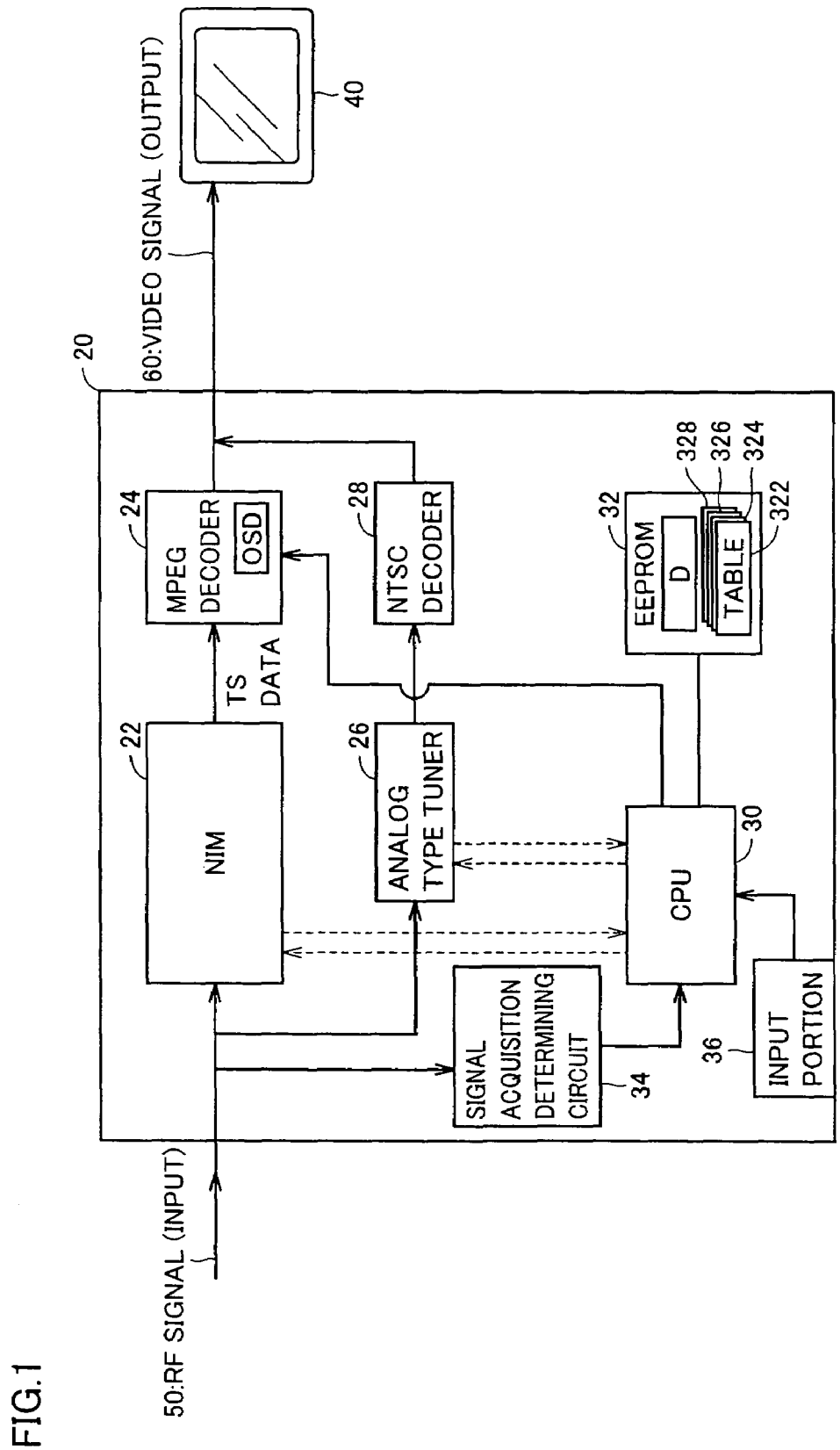
FIG. 1 is an overall configuration diagram of a receiving apparatus according to an embodiment of the present invention.

Hereinafter, an embodiment of the present invention will be described with reference to the drawings. In the following, the same portions have the same reference characters allotted, and have the same names and functions. Therefore, detailed description thereof will not be repeated where appropriate.

FIG. 1 shows a configuration of a receiving apparatus 20 according to an embodiment of the present invention. Receiving apparatus 20 receives and processes a RF (Radio Frequency) signal 50 constituting a high-frequency signal from an input terminal (not shown), and outputs a video signal 60 to an externally connected TV (Television) receiver 40 so that the received broadcast can be watched on TV receiver 40 (in this case, TV receiver 40 operates as an apparatus for displaying a video image using the video signal converted by a MPEG (Motion Picture Experts Group) decoder 24 as will be described later). Herein, receiving apparatus 20 is shown as a STB (Set Top Box) arranged separately from TV receiver 40. Alternatively, receiving apparatus 20 may be incorporated into TV receiver 40 to provide an image receiving apparatus mounted with receiving apparatus 20. Further, the analog TV broadcast signal, which is herein shown as a NTSC (National Television Standards Committee) signal according to the NTSC scheme, is not limited to the signal of this scheme.

Referring to FIG. 1, receiving apparatus 20 includes a processing unit for DTV (Digital Television) broadcasting, a processing unit for analog TV broadcasting of the NTSC signal, a CPU (Central Processing Unit) 30 for controlling the various parts of receiving apparatus 20, an EEPROM (Electrically Erasable and Programmable Read Only Memory) 32 for storing data including connection determination data D and tables 322-328, a signal acquisition determining circuit 34, and an input portion 36.

The processing unit for the DTV broadcasting includes a NIM (Network Interface Module) 22 for receiving and processing RF signal 50 and outputting computer-processible TS (Transport Stream) data to thereby extract a broadcast signal from the digital waves, and a MPEG decoder 24 for receiving and decoding the TS data according to the MPEG scheme (i.e., converting the broadcast signal extracted by NIM 22 to a video signal), and outputting video signal 60. The processing unit for the analog TV broadcasting includes an analog type tuner 26 for receiving RF signal 50 and performing a tuning operation (in the case of the present embodiment, operation of determining whether a periodic signal can be detected or not) to thereby extract a broadcast signal from the analog waves, and a NTSC decoder 28 for decoding the broadcast signal extracted by the tuning operation of analog type tuner 26 according to the NTSC scheme, and outputting video signal 60. MPEG decoder 24 and NTSC decoder 28 are devices that output the broadcast signals extracted by the corresponding tuners, NIM 22 and analog type tuner 26, respectively.

Receiving apparatus 20 may receive at least one of a RF signal of the terrestrial broadcasting and a RF signal of the CATV (Cable Television) broadcasting as RF signal 50.

Connection determination data D in EEPROM 32 indicates whether RF signal 50 is supplied via the terrestrial broadcasting or the CATV broadcasting. Specifically, connection determination data D indicates which one of the following, a device (antenna) for receiving the terrestrial broadcasting or a device (cable) for receiving the CATV broadcasting, is connected to receiving apparatus 20.

Tables 322, 324, 326 and 328 are provided corresponding, e.g., to digital terrestrial broadcasting according to the ATSC (Advanced Television Systems Committee), digital CATV broadcasting, analog terrestrial broadcasting, and analog CATV broadcasting, respectively. Tables 322-328 have a similar configuration, as shown in FIG. 2, and therefore, only table 322 will be described herein.

Table 322 includes channel numbers for respective broadcast stations transmitting the corresponding TV broadcast signals, i.e. in other words a plurality of different broadcast channels, and tuning information and tunability data for the respective channel numbers (in North America or the like, it is often the case that the channel numbers formed of single numbers, such as "2", "4", . . . , are set for the analog broadcasting including the cable television, while the channel numbers formed of a plurality of numbers containing a main number and a sub-number, such as "2-1", "2-2", . . . , are set for the digital broadcasting). The tuning information is read by CPU 30 and supplied to NIM 22 or analog type tuner 26. NIM 22 or analog type tuner 26 then performs the tuning operation based on the tuning information supplied, and outputs to CPU 30 the tunability data indicating whether tuning was successful or not, i.e., whether it succeeded in extracting the broadcast signal of the frequency band indicated by the tuning information (the channel corresponding to the relevant tuning information) from RF signal 50 input. The tuning information read from tables 322 and 324 are supplied to NIM 22, while the tuning information read from tables 326 and 328 are supplied to analog type tuner 26.

Signal acquisition determining circuit 34 in FIG. 1 outputs acquisition result information indicating that an 8 VSB (Vestigial Sideband Modulation) signal has been acquired when waveform spectrum characteristic to the 8 VSB scheme is detected in RF signal 50 input to receiving apparatus 20. When waveform spectrum characteristic to the QAM (Quadrature Amplitude Modulation) scheme is detected, it outputs acquisition result information indicating that a QAM signal has been acquired. Upon detection of waveform spectrum characteristic to the NTSC signal, it outputs acquisition result information indicating that a NTSC signal has been acquired. If none of these waveform spectra is detected, it outputs acquisition result information indicating that no signal has been acquired. The acquisition result information output is provided to CPU 30.

Input portion 36 receives information from a user via a key input. The information received may include a channel number of the type used for the analog broadcasting and a channel number of the type used for the digital broadcasting. The information received is provided to CPU 30.

In receiving apparatus 20 according to the present embodiment, auto scan can be carried out, where (receiving) channels are automatically assigned for the broadcast signals of the receivable broadcast stations. Receiving apparatus 20 is capable of receiving any of digital terrestrial broadcasting, digital CATV broadcasting, analog terrestrial broadcasting, and analog CATV broadcasting. Thus, it is necessary to determine, prior to the auto scan, which of the following, the broadcast signal of the terrestrial broadcasting or that of the CATV broadcasting, receiving apparatus 20 is configured to receive through the antenna or the cable connected thereto, and then carry out the auto scan in accordance with the connection manner thus determined.

Figure 3:
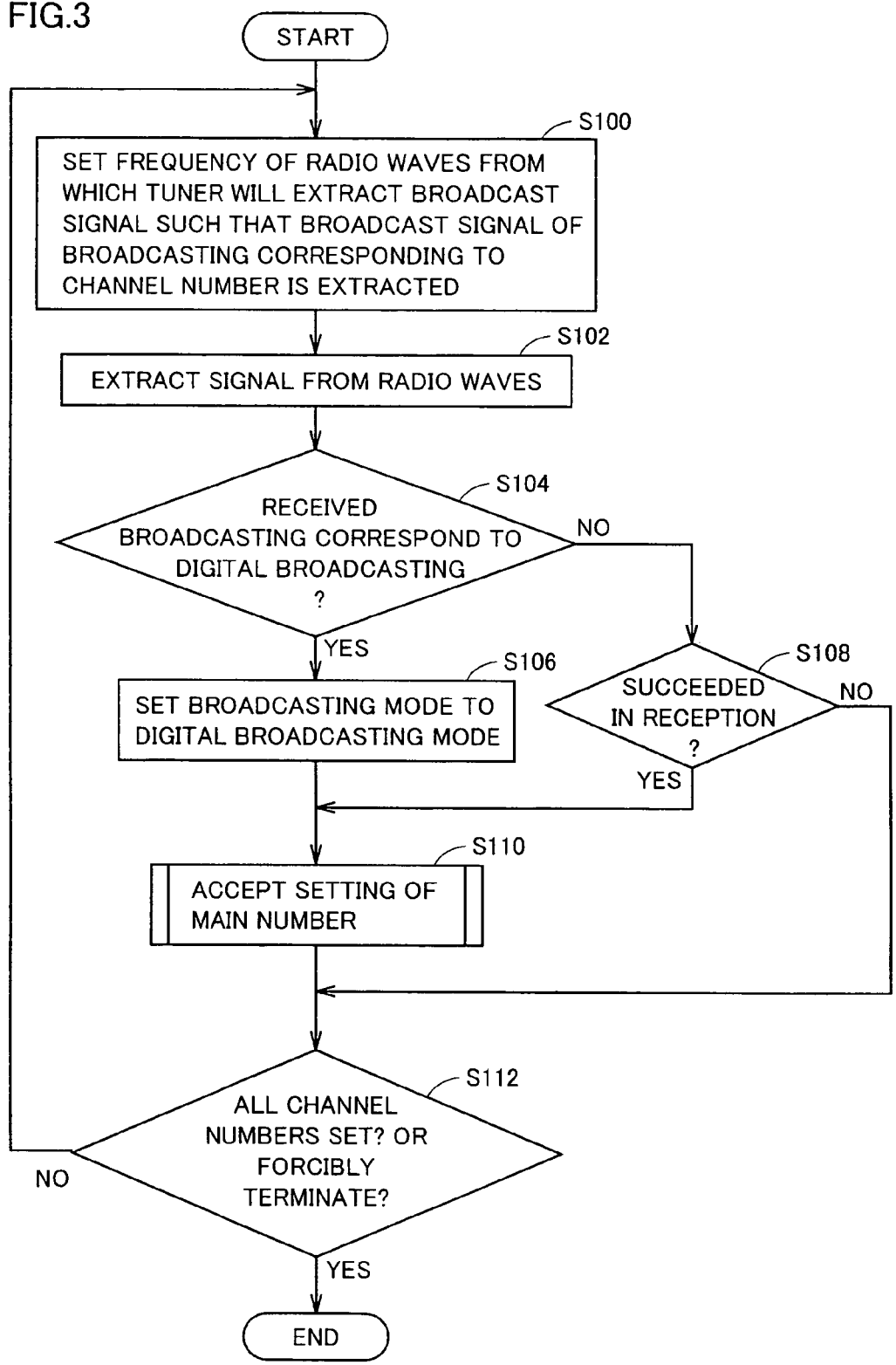
FIG. 3 is a flowchart illustrating control procedure of auto scan processing according to the embodiment of the present invention.

Referring to FIG. 3, a program executed by receiving apparatus 20 has the following control structure regarding channel number setting.

In step (hereinafter, abbreviated as "S") 100, CPU 30 reads tuning information in tables 322-328 from EEPROM 32, and provides the read tuning information to NIM 22 and analog type tuner 26. In doing so, CPU 30 sets the frequency of the radio waves from which the tuners, NIM 22 and analog type tuner 26, will extract the broadcast signal so that the broadcasting of the prescribed frequency is received (more specifically, so that the broadcast signal of the broadcasting corresponding to the channel number is extracted).

In S102, NIM 22 and analog type tuner 26 each extract the broadcast signal from RF signal 50. NIM 22 and analog type tuner 26 each output tunability data to CPU 30.

In S104, CPU 30 determines whether received RF signal 50 is that of the digital broadcasting or not, based on whether NIM 22 has output the tunability data indicating that it succeeded in tuning. If it is determined that the signal is that of the digital broadcasting (YES in S104), the process proceeds to S106. If not (NO in S104), the process proceeds to S108.

In S106, CPU 30 sets the value of connection determination data D stored in EEPROM 32 to "1". In the case of the present embodiment, connection determination data D of "1" represents that receiving apparatus 20 is receiving the digital broadcasting (digital broadcasting mode). Connection determination data D of "0" represents that receiving apparatus 20 is receiving the analog broadcasting (analog broadcasting mode).

In S108, CPU 30 determines whether analog type tuner 26 has succeeded reception by referring to the tunability data output from analog type tuner 26. If it is determined that it succeeded in reception (YES in S108), the process proceeds to S110. If not (NO in S108), the process proceeds to S112. In S110, input portion 36 accepts setting of a main number of the channel number. This processing corresponds to processes in S120-S154, which will be described later.

In S112, CPU 30 determines whether setting or re-setting of all the channel numbers stored in EEPROM 32 has been completed or whether the processing should be forcibly terminated or not. If it is determined that the setting or re-setting of the channel numbers has been completed (YES in S112), the process is terminated. If not (NO in S112), the process returns to S100.

Figure 4:
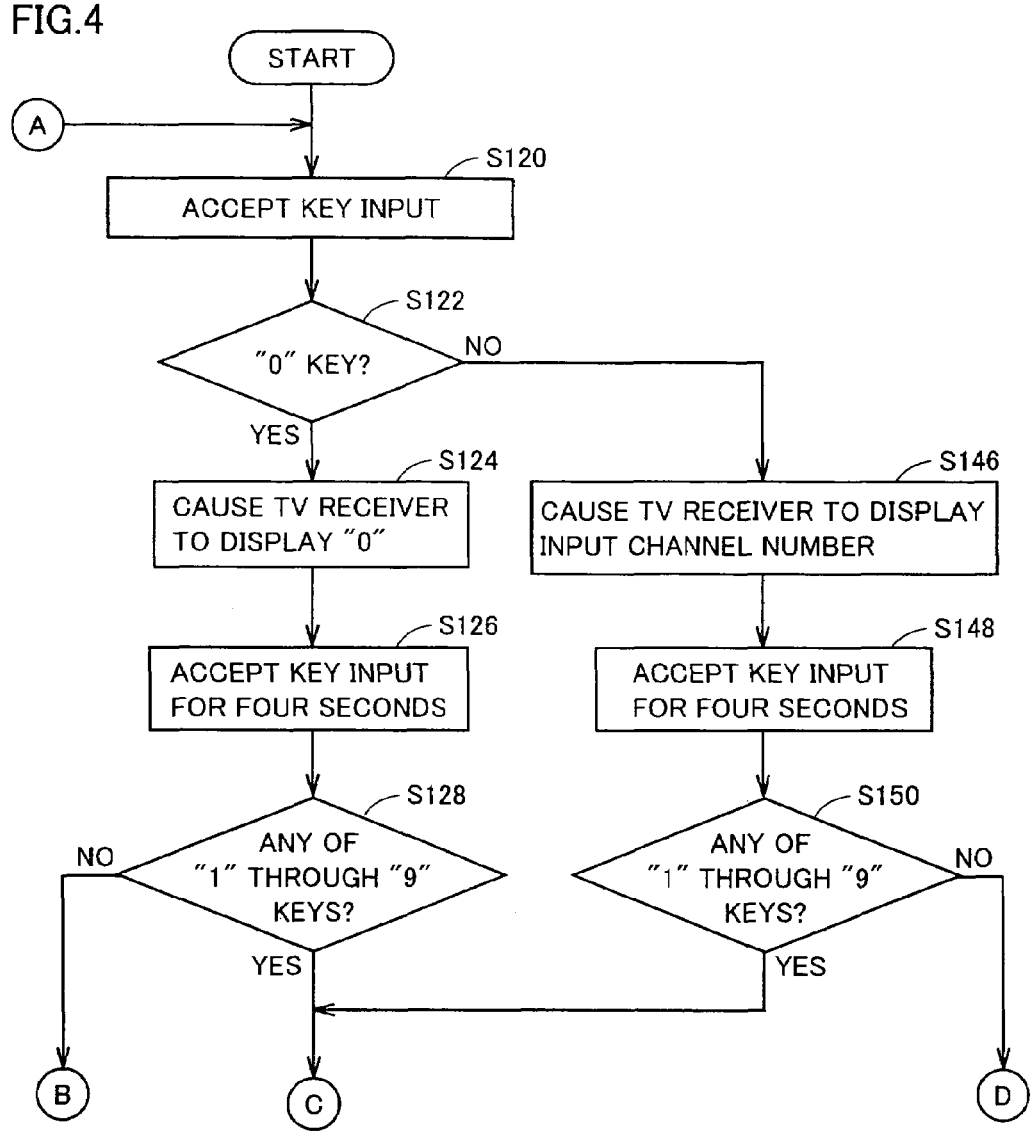
FIGS. 4-6 are flowcharts illustrating control procedure of main number setting processing according to the embodiment of the present invention.
Figure 5:
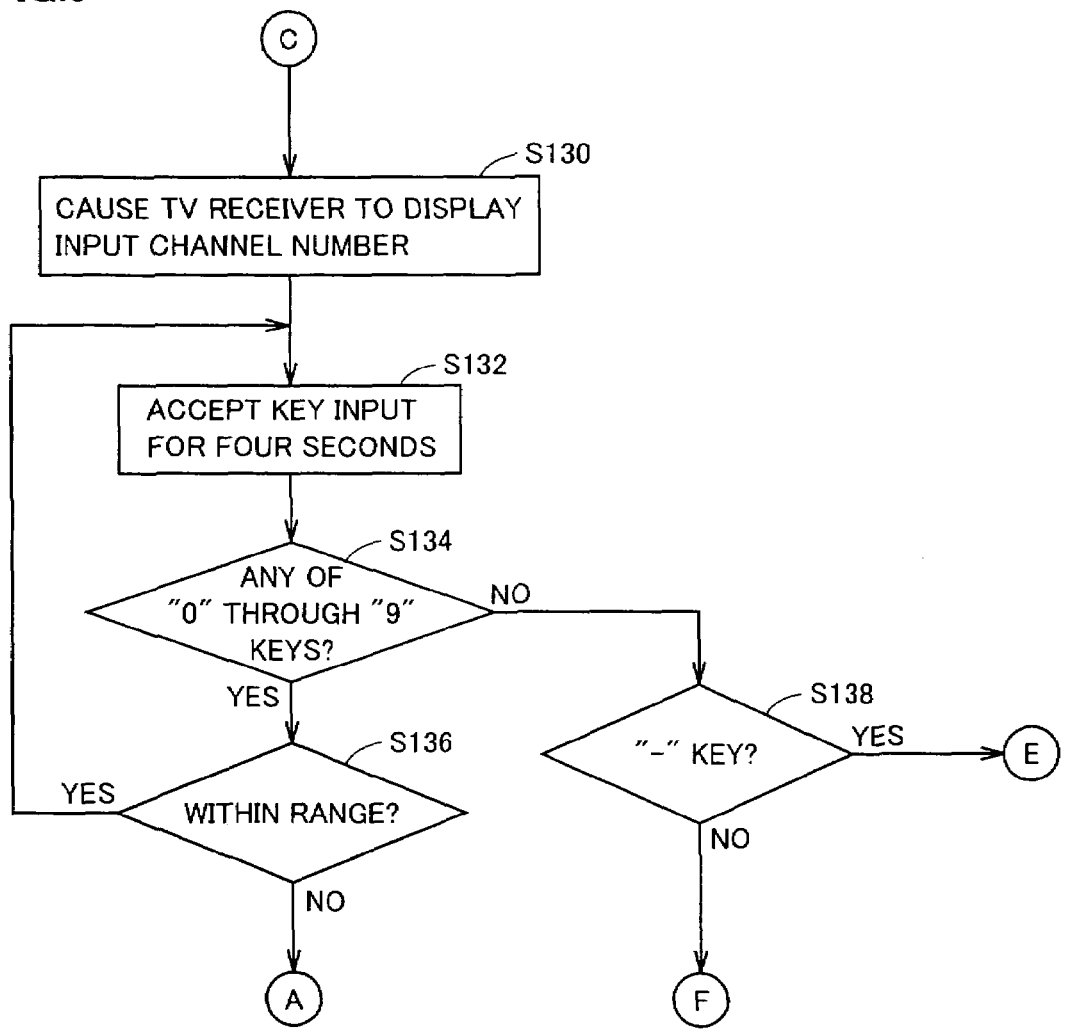
Figure 6:
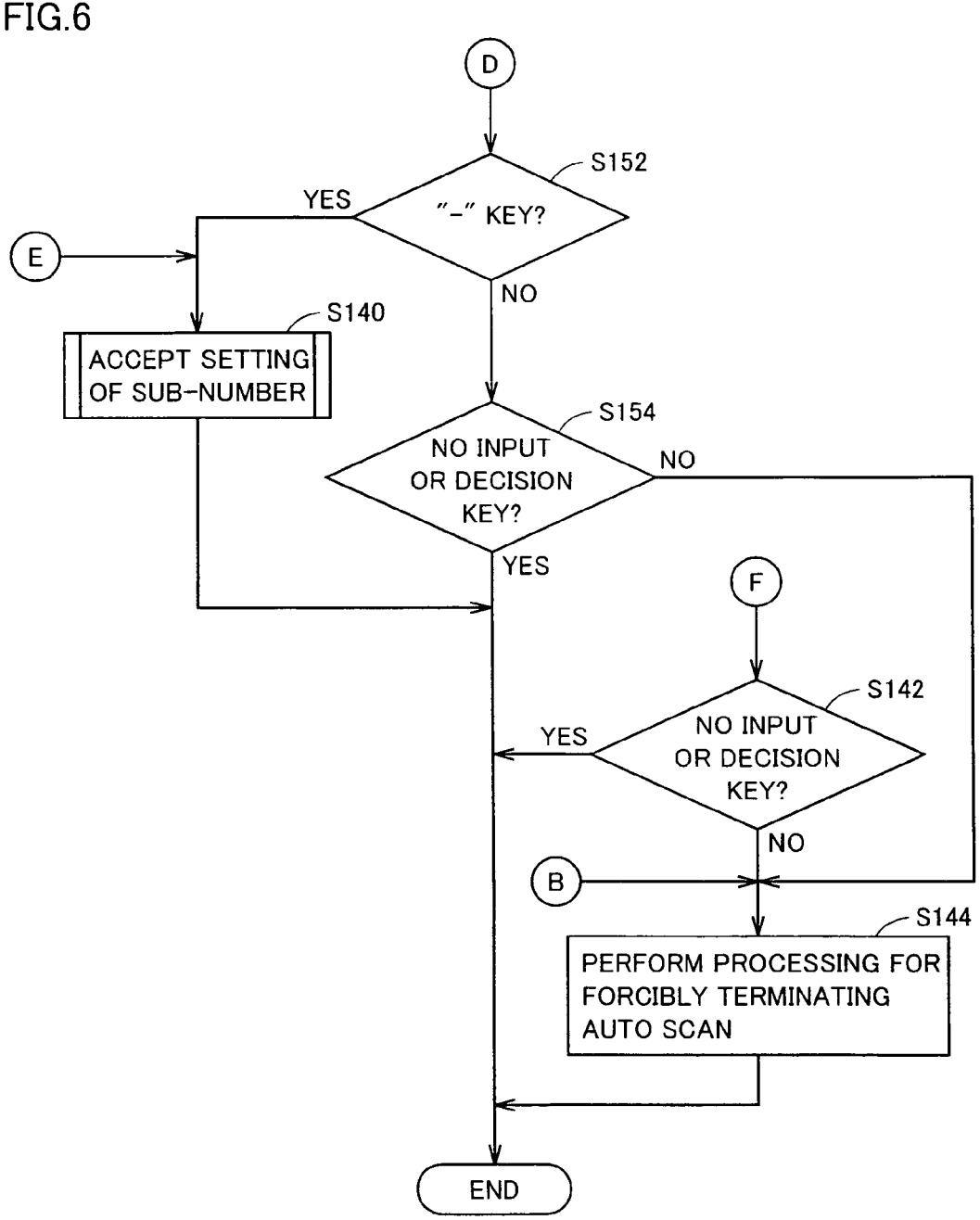

Referring to FIGS. 4-6, a program executed by receiving apparatus 20 regarding the main number setting processing has the following control structure.

In S120, input portion 36 accepts a key input from the user. The information accepted via the key input is provided to CPU 30.

In S122, CPU 30 determines whether there was a key input of a "0" key or not. If it is determined that there was the input of the "0" key (YES in S122), the process proceeds to S124. If not (NO in S122), the process proceeds to S146. In S124, CPU 30 causes TV receiver 40 to display "0". In S126, input portion 36 accepts a key input for four seconds.

In S128, CPU 30 determines whether there was a key input of any of "1" through "9" keys. If it is determined that there was the input of any of the "1" through "9" keys (YES in S128), the process proceeds to S130. If not (NO in S128), the process proceeds to S144.

In S130, CPU 30 causes the number (channel number), corresponding to the key input made, to be displayed. In S132, input portion 36 accepts a key input for four seconds.

In S134, CPU 30 determines whether there was a key input of any of the "0" through "9" keys. If it is determined that there was the input of any of the "0" through "9" keys (YES in S134), the process proceeds to S136. If not (NO in S134), the process proceeds to S138.

In S136, CPU 30 determines whether the channel number accepted in S120-S132 is within a range (in the present embodiment, the "range" means a range predetermined as the channel numbers). If it is determined that it is within the range (YES in S136), the process proceeds to S132. If not (NO in S136), the process proceeds to S120.

In S138, CPU 30 determines whether there was a key input of a "-" key. If it is determined that there was the input of the "-" key (YES in S138), the process proceeds to S140. If not (NO in S138), the process proceeds to S142. In S140, input portion 36 and CPU 30 accept the sub-number setting. This processing corresponds to processes in S160-S188, which will be described later.

In S142, CPU 30 determines whether there was no key input at input portion 36 or whether there was a key input of a decision key. If there was no key input or there was the input of the decision key (YES in S142), the process is terminated. If not (NO in S142), the process proceeds to S144.

In S144, CPU 30 performs processing for forcibly terminating the auto scan. In S146, CPU 30 causes TV receiver 40 to display the input channel number. In S148, input portion 36 accepts a key input for four seconds.

In S150, CPU 30 determines whether there was a key input of any of the "1" through "9" keys. If it is determined that there was the input of any of the "1" through "9" keys (YES in S150), the process proceeds to S130. If not (NO in S150), the process proceeds to S152.

In S152, CPU 30 determines whether there was a key input of the "-" key. If it is determined that there was the input of the "-" key (YES in S152), the process proceeds to S140. If not (NO in S152), the process proceeds to S154.

In S154, CPU 30 determines whether there was no key input or whether there was a key input of the decision key. If it is determined that there was no key input or there was the input of the decision key (YES in S154), the process is terminated. If not (NO in S154), the process proceeds to S144.

Figure 7:
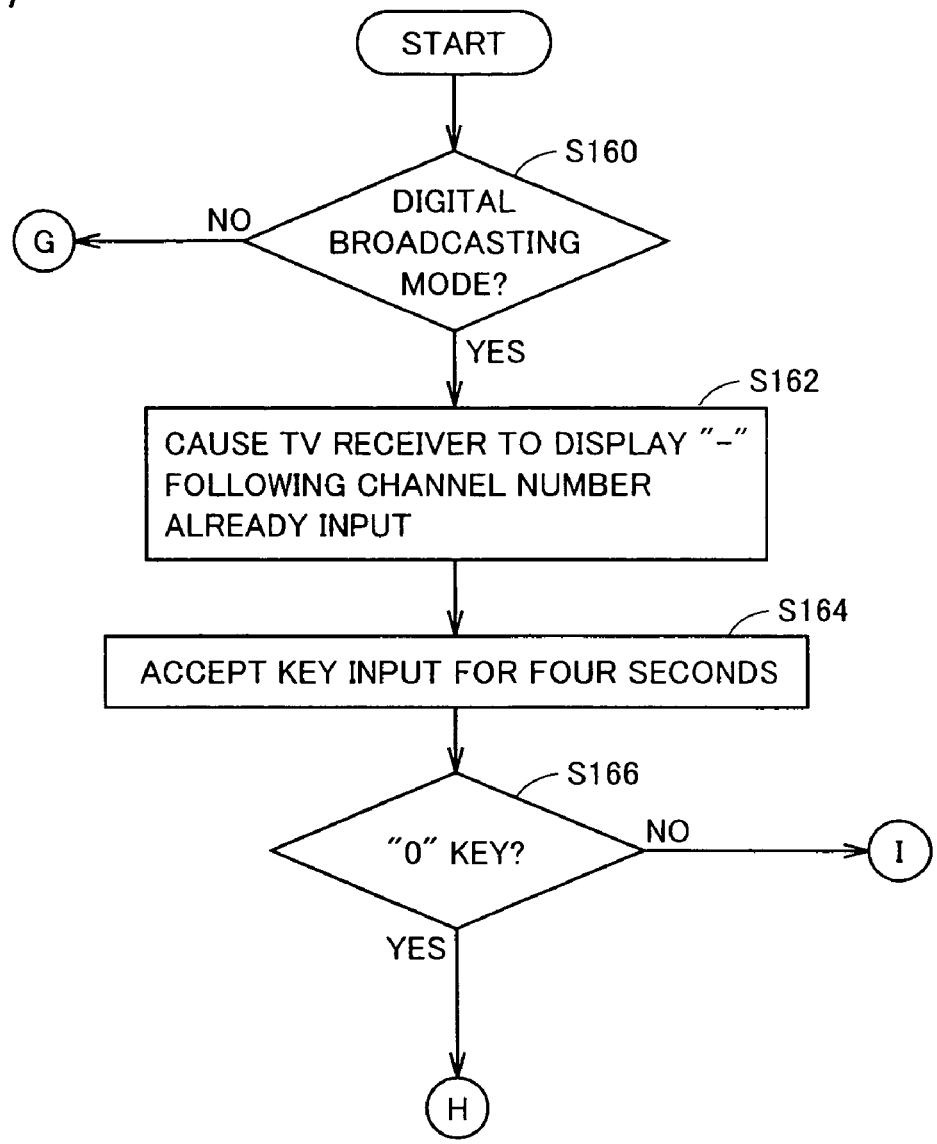
FIGS. 7-9 are flowcharts illustrating control procedure of sub-number setting processing according to the embodiment of the present invention.
Figure 8:
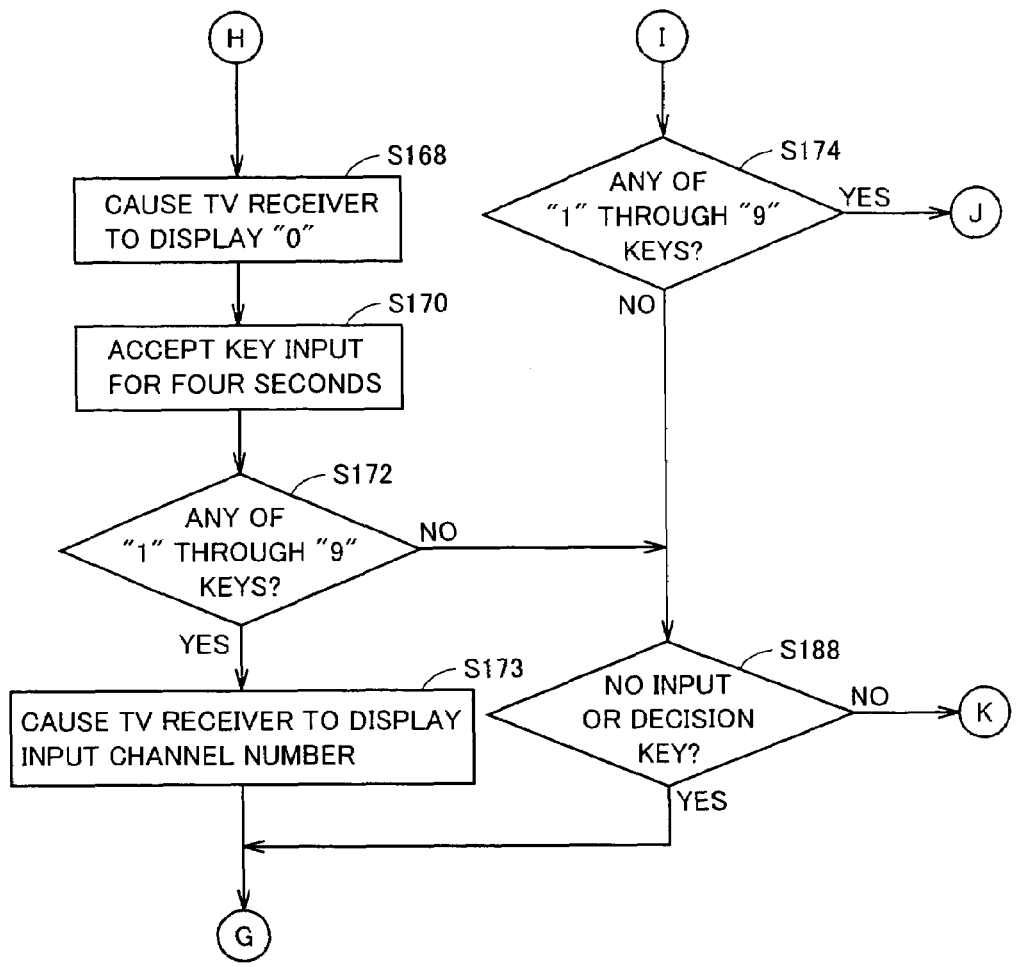
Figure 9:
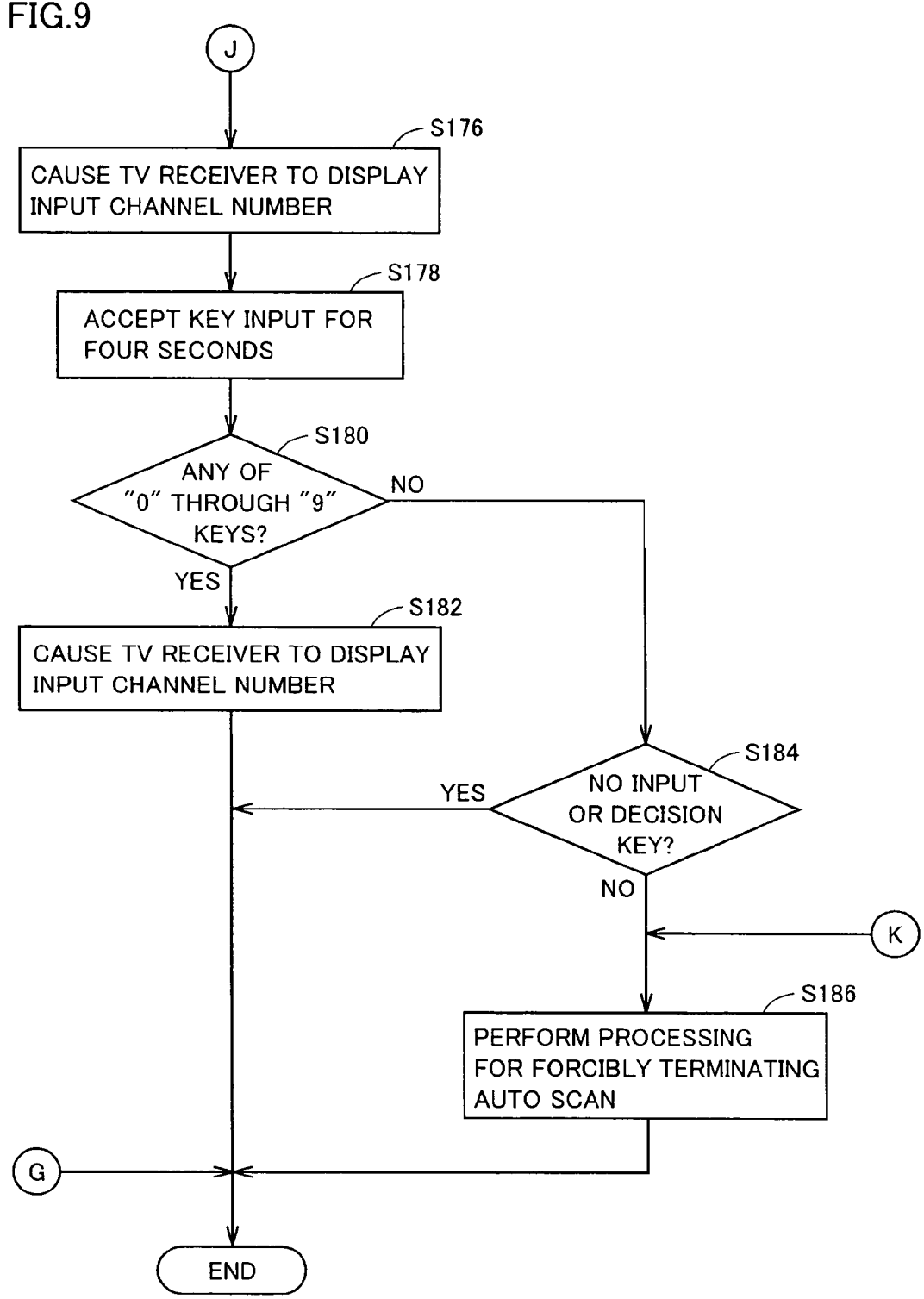

Referring to FIGS. 7-9, a program executed by receiving apparatus 20 regarding the sub-number setting processing has the following control structure.

In S160, CPU 30 determines whether receiving apparatus 20 is in the digital broadcasting mode or not, by referring to connection determination data D stored in EEPROM 32. If it is determined that it is in the digital broadcasting mode (YES in S160), the process proceeds to S162. If not (NO in S160), the process is terminated. In S162, CPU 30 causes TV receiver 40 to display "-", following the channel number already input. In S164, input portion 36 accepts a key input for four seconds.

In S166, CPU 30 determines whether there was a key input of the "0" key. If it is determined that there was the input of the "0" key (YES in S166), the process proceeds to S168. If not (NO in S166), the process proceeds to S174. In S168, CPU 30 causes TV receiver 40 to display "0", following the "-" already displayed. In S170, input portion 36 accepts a key input for four seconds.

In S172, CPU 30 determines whether there was a key input of any of the "1" through "9" keys. If it is determined that there was the input of any of the "1" through "9" keys (YES in S172), the process proceeds to S173. If not (NO in S172), the process proceeds to S188.

In S173, CPU 30 causes TV receiver 40 to display the channel number corresponding to the key input made.

In S174, CPU 30 determines whether there was a key input of any of the "1" through "9" keys. If it is determined that there was the input of any of the "1" through "9" keys (YES in S174), the process proceeds to S176. If not (NO in S174), the process proceeds to S188.

In S176, CPU 30 causes TV receiver 40 to display the channel number corresponding to the key input made, following the channel number already displayed. In S178, input portion 36 accepts a key input for four seconds.

In S180, CPU 30 determines whether there was a key input of any of the "0" through "9" keys. If it is determined that there was the input of any of the "0" through "9" keys (YES in S180), the process proceeds to S182. If not (NO in S180), the process proceeds to S184. In S182, CPU 30 causes TV receiver 40 to display the channel number corresponding to the key input made, following the channel number already displayed.

In S184, CPU 30 determines whether there was no key input at input portion 36 or whether there was a key input of the decision key. If it is determined that there was no key input or there was the input of the decision key (YES in S184), the process is terminated. If not (NO in S184), the process proceeds to S186. In S186, CPU 30 performs the processing for forcibly terminating the auto scan.

In S188, CPU 30 determines whether there was no key input or whether there was a key input of the decision key. If it is determined that there was no key input or there was the input of the decision key (YES in S188), the process is terminated. If not (NO in S188), the process proceeds to S186.

Hereinafter, an operation of receiving apparatus 20 based on the above-described structure and flowcharts will be described.

<In the Case Where Digital Broadcasting Has Not Been Received After Purchase of Receiving Apparatus 20>

CPU 30 sets the frequency of the radio waves from which NIM 22 and analog type tuner 26 will extract the broadcast signal so as to receive the broadcasting of the prescribed frequency (S100). In the present embodiment, it is assumed that CPU 30 does not discriminate whether the prescribed frequency is the one used for the analog broadcasting or the one used for the digital broadcasting. When NIM 22 and analog type tuner 26 are controlled, NIM 22 and analog type tuner 26 each extract the broadcast signal from RF signal 50 (S102). When the broadcast signal is extracted, CPU 30 determines whether the received broadcasting is the digital broadcasting or not (S104). Specifically, CPU 30 determines whether NIM 22 (one of the tuners in the present embodiment) has extracted the broadcast signal of the digital broadcasting or not.

In the present case, the received broadcasting is the analog broadcasting (NO in S104). Thus, CPU 30 determines whether the analog broadcasting was received successfully or not (S108). In this manner, CPU 30 controls input portion 36 such that it accepts the channel number of the type different from that for the digital broadcasting during a period from the time when the frequency value set by CPU 30 itself has been established to the time when CPU 30 itself determines that NIM 22 has extracted the broadcast signal of the digital broadcasting.

Figure 10:
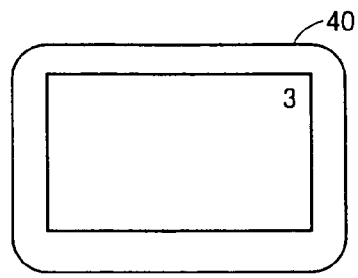
FIG. 10 shows a screen of a TV receiver according to the embodiment of the present invention when a number of the ten's place is input.

In this case, if the analog broadcasting was received successfully (YES in S108), input portion 36 accepts a key input (S120). When the key input is accepted, CPU 30 determines whether the key input was of the "0" key or not (S122). In this case, if there was the key input of the "3" key (NO in S122), CPU 30 causes TV receiver 40 to display the channel number "3" corresponding to the key input made (S146). FIG. 10 shows the screen of TV receiver 40 on which the channel number "3" is displayed. In this case, there is no concept of the "sub-number", since the key input for the analog broadcasting (the key input designating only the number corresponding to the "main number" in the channel number for the digital broadcasting) is accepted. That is, the key input accepted is similar to the one that was common before commercialization of the digital broadcasting.

Figure 11:
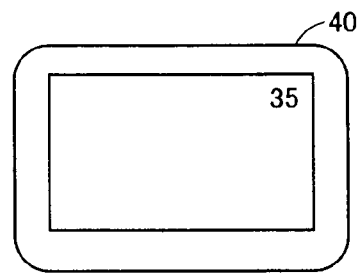
FIG. 11 shows a screen of the TV receiver of the embodiment of the present invention when a number of the one's place is input.

When the channel number is displayed, input portion 36 accepts a key input for four seconds (S148). When the key input is accepted, CPU 30 determines whether the key input was of any of the "1" through "9" keys (S150). If there was the input of the "5" key (YES in S150), CPU 30 causes TV receiver 40 to display the channel number "5" corresponding to the key input made, following the channel number "3" already displayed (S130). FIG. 11 shows the screen of TV receiver 40 when the channel number "5" is displayed.

When the channel number is displayed, input portion 36 accepts a key input for four seconds (S132). When the key input is accepted, CPU 30 determines whether the key input was of any of the "0" through "9" keys (S134). In this case, assume that there was the input of the decision key (NO in S134). CPU 30 determines whether the key input was of the "-" key or not (S138). In this case, since the key input was of the decision key (NO in S138), CPU 30 determines whether there was no key input or there was a key input of the decision key (S142). In this case, since the key input was of the decision key (YES in S142), CPU 30 determines whether setting or re-setting of all the channel numbers stored in EEPROM 32 has been completed or whether the processing should be forcibly terminated or not (S112). In this case, assume that not all the channel numbers have been set or re-set (NO in S112). Then, CPU 30 sets the frequency of the radio waves from which NIM 22 and analog type tuner 26 will extract the broadcast signal so that the broadcasting of the prescribed frequency is received (S100). Assume that the setting or re-setting of all the channel numbers has now been completed (YES in S112). CPU 30 then terminates the processing. Thereafter, when input portion 36 accepts a channel number, CPU 30 will set the frequency of the radio waves from which the tuners, i.e., NIM 22 and analog type tuner 26, will extract the broadcast signal, so that the broadcast signal of the broadcasting corresponding to the relevant channel number is extracted.

<In the Case Where Receiving Apparatus 20 Has Received Digital Broadcasting>

When the broadcast signal is extracted from RF signal 50, CPU 30 determines whether the received signal is of the digital broadcasting or not (S104). In the present case, the received broadcasting is of the digital broadcasting (YES in S104), and thus, CPU 30 sets the broadcasting mode of receiving apparatus 20 to the digital broadcasting mode (S106).

Figure 12:
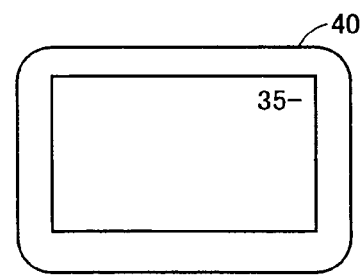
FIG. 12 shows a screen of the TV receiver of the embodiment of the present invention when "-" is input.

When the broadcasting mode is set to the digital broadcasting mode, after the processes in S120-S130 are carried out, input portion 36 accepts a key input for four seconds (S132). When the key input is accepted, CPU 30 determines whether the key input was of any of the "0" through "9" keys (S134). In the present case, the key input was of the "-" key (NO in S134). CPU 30 determines whether the key input was of the "-" key or not (S138). Since the key input was of the "-" key (YES in S138), CPU 30 then determines whether the broadcasting mode is the digital broadcasting mode or not (S160). In the present case, the broadcasting mode is the digital broadcasting mode (YES in S160), and thus, CPU 30 causes TV receiver 40 to display "-", following the channel number already input (S162). FIG. 12 shows the screen of TV receiver 40 when "-" is displayed after there was the input of "35" as the main number.

Figure 13:
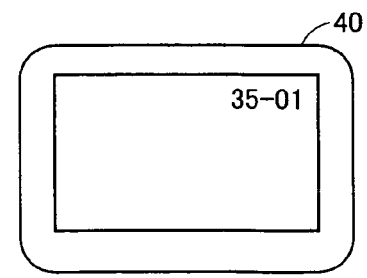
FIG. 13 shows a screen of the TV receiver of the embodiment of the present invention when input of the sub-number is completed.

When "-" is displayed, input portion 36 accepts a key input for four seconds (S164). This allows input of the sub-number. When the key input is accepted, CPU 30 determines whether the key input was of the "0" key or not (S166). In this case, if the key input was of the "0" key (YES in S166), CPU 30 causes "0" to be displayed following "-" already input (S168). When "0" is displayed, input portion 36 accepts a key input for four seconds (S170). When the key input is accepted, CPU 30 determines whether the key input was of any of the "1" through "9" keys (S172). In this case, if the key input was of the "1" key (YES in S172), CPU 30 causes TV receiver 40 to display the channel number corresponding to the key input made, following the channel number already displayed (S173). FIG. 13 shows the screen of TV receiver 40 on which "1" is displayed. As such, the main number and the sub-number are displayed.

As described above, the receiving apparatus according to the present embodiment accepts the channel setting for the digital broadcasting in the case of receiving the digital broadcasting. This means that the user who watches the analog broadcasts exclusively (e.g., the user watching all the broadcast programs via the cable television) does not need to make any key input for the digital broadcasting. Meanwhile, the user who watches the digital broadcasts can make the key input for the analog broadcasting and the key input for the digital broadcasting (e.g., the sub-number is accepted). Accepting the channel setting in this manner will further improve manipulability and convenience for users as the ways of receiving the broadcasting becomes more and more diversified. The receiving apparatus according to the present embodiment is particularly suitable for mass-production, since it can be manufactured through the step of storing the programs executed by the CPU in the EEPROM, among others. As a result, it is possible to provide a receiving apparatus suitable for mass-production and capable of further improving the manipulability and convenience for the user who watches the analog broadcasts exclusively. Further, it is possible to provide the receiving apparatus and the TV receiver of the present embodiment (when TV receiver 40 incorporates receiving apparatus 20 therein, that TV receiver) as an image receiving apparatus that can further improve the manipulability and convenience for the user who watches the analog broadcasts exclusively.

It is noted that control performed by CPU 30 in S108 to make input portion 36 accept the channel number of the type different from that for the digital broadcasting may be carried out after a plurality of frequency values have been established (in the case of the present embodiment, after the frequencies for a plurality of channel numbers have been set up). In this case, input portion 36 is controlled to accept the channel number of the type different from that for the digital broadcasting during a period from the time when the plurality of frequency values set by CPU 30 itself have been established to the time when CPU 30 itself determines that NIM 22 has extracted the broadcast signal of the digital broadcasting.

Further, receiving apparatus 20 is not restricted to the STB. For example, receiving apparatus 20 may be a DVD (Digital Versatile Disk) recorder or a hard disk recorder.

Furthermore, in S100, the order of the frequency settings by CPU 30 may be differentiated according to whether the prescribed frequency is one used for the analog broadcasting or one used for the digital broadcasting. For example, priority may be given to the frequencies used for the analog broadcasting, or to the frequencies used for the digital broadcasting. The order may be designated by the user in advance. In the case where CPU 30 sets the frequencies in the order designated in advance by the user, it may be configured such that, once the user designates either one frequency for the analog broadcasting or one frequency for the digital broadcasting, only the frequencies for the relevant broadcasting are set afterwards. In the case where only the frequencies for the analog broadcasting or the digital broadcasting designated by the user are to be set, the channel numbers for the analog broadcasting and the channel numbers for the digital broadcasting are both accepted before the auto scan (i.e., before the frequencies set by CPU 30 are established), and once the channel number for the analog broadcasting (i.e., the channel number different from that for the digital broadcasting) is designated, only the channel numbers for the analog broadcasting (i.e., the channel numbers different from those for the digital broadcasting) are accepted by input portion 36 after the auto scan.

Still further, CPU 30 may control input portion 36 such that it accepts the channel numbers of the type different from those for the digital broadcasting after shipment from a factory until NIM 22 extracts a broadcast signal of the digital broadcasting for the first time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for receiving a broadcast signal, comprising:
    a central processing unit (CPU) configured to perform an auto-scan for a plurality of channels to set a frequency for each channel;
    a tuner configured to:
        receive a plurality of radio wave frequency signals and extract the broadcast signal from one of the plurality of radio frequency signals, wherein the extracted broadcast signal corresponds to a channel number accepted by an accepting portion;
    a determining unit configured to determine whether the extracted broadcast signal is a digital broadcast signal or an analog broadcast signal;
    a control unit configured to control the accepting portion to accept a channel number for an analog broadcast between a time of the auto-scan until a time that a digital broadcast signal is extracted by the tuner, wherein an analog broadcast signal is extracted by the tuner while the accepting portion accepts the channel number for the analog broadcast; and
    an output device configured to output the broadcast signal extracted by the tuner.

2. The receiving apparatus of claim 1, wherein the CPU is further configured to read tuning and channel information from plurality of tables stored in a memory of the receiving apparatus and provide the tuning and channel information to the tuner.

3. The receiving apparatus of claim 1, further comprising:
    a input portion configured to accept a plurality of key inputs from a user, wherein the plurality of key inputs are used to input a sub-number corresponding to a digital broadcast channel.

4. An image receiving apparatus, comprising:
    a central processing unit (CPU) configured to perform an auto-scan for a plurality of channels to set a frequency for each channel;
    a tuner configured to:
        receive a plurality of radio wave frequency signals and extract A broadcast signal from one of the plurality of radio frequency signals, wherein the extracted broadcast signal corresponds to a channel number accepted by an accepting portion;

a determining unit configured to determine whether the extracted broadcast signal is a digital broadcast signal or an analog broadcast signal;

a control unit configured to control the accepting portion to accept a channel number for an analog broadcast between a time of the auto-scan until a time that a digital broadcast signal is extracted by the tuner, wherein an analog broadcast signal is extracted by the tuner while the accepting portion accepts the channel number for the analog broadcast; and a display device configured to display a video image obtained by converting the extracted broadcast signal to a video signal.

* * * * *